Dec. 13, 1955  J. S. KUSLICH  2,726,473
ARTIFICIAL FISH BAIT OR LURE
Filed April 10, 1953
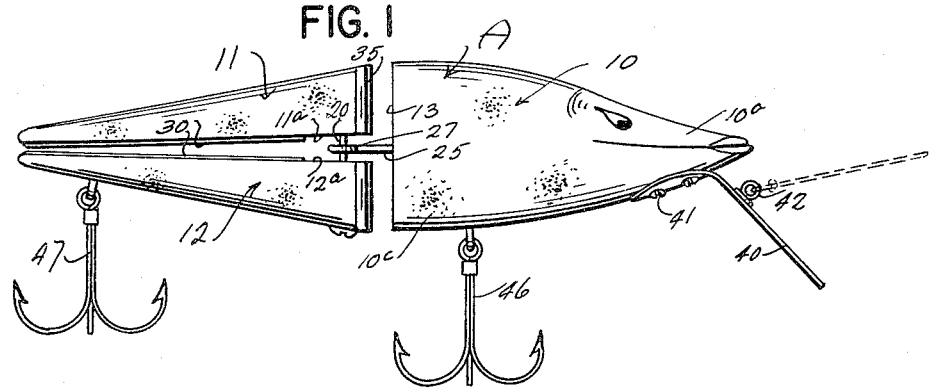
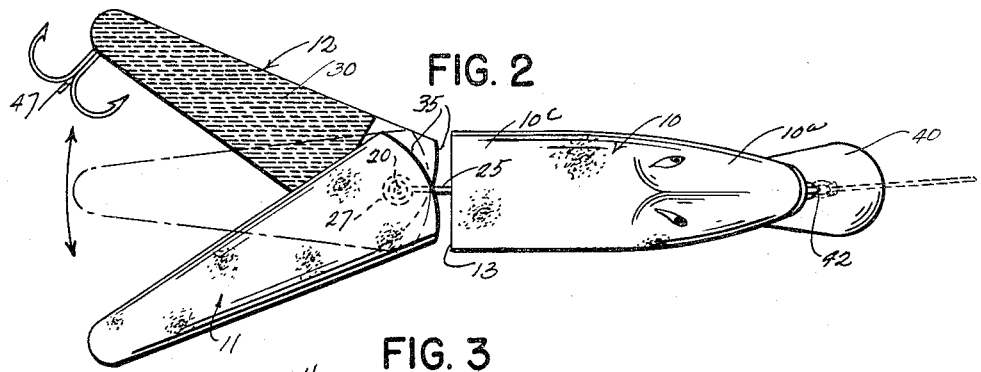
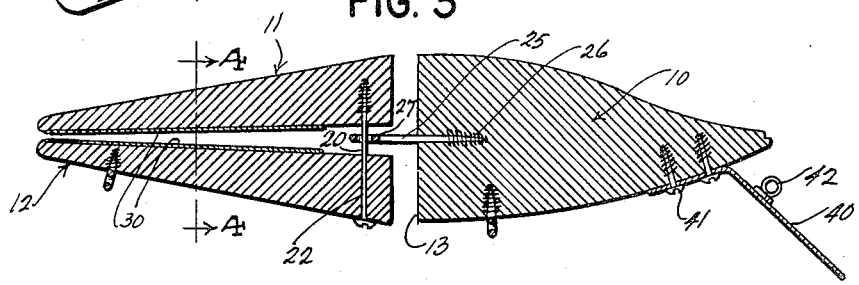
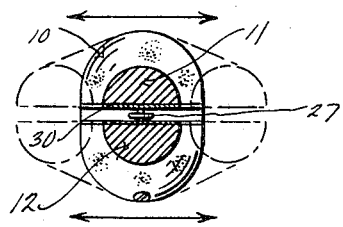
INVENTOR
John S. Kuslich
ATTORNEYS

United States Patent Office 2,726,473
Patented Dec. 13, 1955

---

2,726,473

ARTIFICIAL FISH BAIT OR LURE

John S. Kuslich, St. Paul, Minn.

Application April 10, 1953, Serial No. 348,073

4 Claims. (Cl. 43—42.15)

This invention relates to improvements in artificial fish baits or lures.

The primary object of this invention is to provide an artificial fish bait or lure, the rear sections of which are relatively movable with respect to each other and with respect to the fore section of the bait so as to simulate a true scissor action as the bait is moved through the water.

A further object of this invention is the provision of an artificial fish bait having certain characteristics of the bait or lure structure shown in my U. S. Patent 2,416,834, patented March 4, 1947, but embodying improvements thereover in the provision of a bait having a rear body and tail provided with horizontally split sections which operate in superposed relation with a true scissor oscillating action.

A further object of this invention is the provision of improved means for durably and efficiently pivotally connecting the tail sections of a fishing bait lure to a fore section.

A further object of this invention is the provision of improved reflecting means associated with an artificial lure.

Other objects and advantages of this invention will be apparent during the course of the following detailed description.

In the accompanying drawing, forming a part of this specification, and wherein similar reference characters designate corresponding parts throughout the several views:

Fig. 1 is a side elevation of the improved artificial lure.

Fig. 2 is a plan view showing the tail sections spread apart in open scissor like fashion; the dot and dash lines designating their normal superposed position with respect to each other and the fore body portion of the fish.

Fig. 3 is a longitudinal cross sectional view taken through the improved fishing lure, in a vertical plane.

Fig. 4 is a transverse cross sectional view taken through the lure, substantially on the line 4—4 of Fig. 3; the dot and dash lines designating the relative swing positions of the upper and lower rear portions of the lure.

In the drawing, wherein for the purpose of illustration is shown only a preferred embodiment of the invention, the letter A generally designates the lure. It may be constructed of any approved materials, heavy or buoyant, wood or any approved composition of matter, such as synthetic plastic. The coloring and shape may be made to conform to various designs or fish appearances.

In the particular arrangement of lure shown, there is provided a fore or front body portion 10 simulating approximately one-half of the front quarters of a fish, to which is rearwardly connected the rear body and tail portions, designated at 11 and 12. The rear body and tail portions 11 and 12 are divided from the front section in a transverse vertical plane about midway between the ends of the lure. The sections 11 and 12 are relatively connected to each other upon a vertical pivot, so that they will move relative to each other with a scissor like action.

As shown in the drawing, the front portion 10 includes the head 10a and the portion 10c which normally would be part of the body of the fish simulated in the lure. A rear wall 13 of the front portion 10 lies in a plane at right angles to the longitudinal axis of the lure.

The rear portions 11 and 12, each of which designate some portion of the body of the fish represented by the lure and the tail sections of the fish, are similar counterparts. They taper with a diminishing effect toward the tail ends. Their contour is preferably convexed and shaped to conform to the convexity in contour of the front body portion 10. The facing surfaces of the scissor portions 11 and 12, designated at 11a and 12a, are parallel and planate.

The pivot means for connecting the lure sections 10, 11 and 12 preferably comprises a vertically disposed pivot pin 20 screw threaded into the upper section 11 and depending therefrom. The shank is sufficiently long to permit of its slidable accommodation within a passageway 22 in the lower section 12, so that actually the rear sections 11 and 12 can be moved towards and away from each other within the degree limited by the head end of the pin 20. This looseness permits of proper play of the sections 11 and 12 within water.

The connecting means for the lure sections furthermore includes a screw eye 25 threaded at 26 in the rear end of the fore portion 10 of the lure, extending rearwardly axially therefrom about centrally of the face 13; the rear eye 27 freely and slidably receiving the shank of the pivot pin 20 therethrough. The thickness of the eye 27 limits the extent of movement of the sections 11 and 12 towards each other, at the pivot point connection.

The facing flat surfaces 11a and 12a of the scissor sections 11 and 12 are provided with material 30 producing a contrasting effect with respect to the coloring of the lure surfacing. This may be a paint or crystalline structure, to give a flashing effect. Since the surface 11a faces down and the surface 12a faces up, there will be a flashing effect both below and above the lure during its travel through the water, as the tail sections move with their scissor like action.

It is to be noted that the front edges 35 of the sections 11 and 12 are bevelled, so as to prevent binding against the face 13 of the front section. All of the parts are sufficiently relatively spaced and loose in play to permit of effective action against binding of the parts at the pivot construction, or with respect to each other.

A diving bib, or plate or spoon construction, designated at 40, may be secured at 41 to the underfront surface of the front section 10, and this may be provided with an eye 42 for connection of a line or swivel thereto.

Any of the parts 10, 11 and 12 may be provided with hooks, but as shown in the drawing, the undersurface of the sections 10 and 12 are provided with pivotal hooks 46 and 47.

The improved lure has a more vigorous action effect than the lure of my Patent 2,416,834, in that both the rear body and tail sections are pivoted with respect to each other and the front body portion 10. The rear sections move in opposite scissor like action as is designated in Figs. 2 and 4 of the drawings. It is to be noted that there are no side restrictions to limit the scissor action.

Various changes in the contouring of the lure, as to shape, size, and arrangement of parts, may be made, without departing from the spirit of the invention or scope of the claims.

I claim:

1. An elongated artificial fishing lure comprising a front portion simulating the front part of some fish luring animate object means for connecting a fishing line to said front portion; a pair of rear portions designating respectively the rear upper portion of the simulated animate object and the rear lower portion of the simulated animate object, means pivotally connecting the rear portions together on a vertical pivot axis at their fore ends whereby they may be relatively oscillated with a scissor-like motion in horizontal substantially parallel planes, and means connecting the front portion forwardly of and pivotally to the said rear portions so as to maintain said pivot axis of the two rear portions nonrotatable in a transverse plane about the lengthwise axis of said lure whereby all three of said portions are pivotally connected to one another, and fishing hook means for said portions.

2. A fishing lure as described in claim 1 wherein the two rear portions are provided with high light reflective facing surfaces, the reflecting surface of the upper rear portion facing downwardly and the reflecting surface of the lower rear portion facing upwardly.

3. An artificial fishing lure simulating a fish comprising an elongated front portion simulating the head and a part of the front body portion of the fish, means for connecting a fishing line to the said front portion, a pair of elongated rear portions each forming a rear portion of the body and the tail of the simulated fish, means connecting said rear portions together for relative oscillation, and means connecting said rear portions to the rear of the front portion on a normally vertical axis which is nonrotatable in a transverse plane about the lengthwise axis of the lure.

4. An artificial fishing lure as described in claim 3 in which the rear body portions having facing surfaces provided with high light reflective material.

References Cited in the file of this patent
UNITED STATES PATENTS

| | | |
|---|---|---|
| 1,603,118 | Knill | Oct. 12, 1926 |
| 2,416,834 | Kuslich | Mar. 4, 1937 |
| 2,425,658 | Urban | Aug. 12, 1947 |
| 2,606,389 | Fortmann | Aug. 12, 1952 |